(No Model.)
C. ANDERSEN & A. WOOLNER, Jr.
PROCESS OF PREPARING WHOLE GRAIN FOR FERMENTATION.
No. 338,579. Patented Mar. 23, 1886.
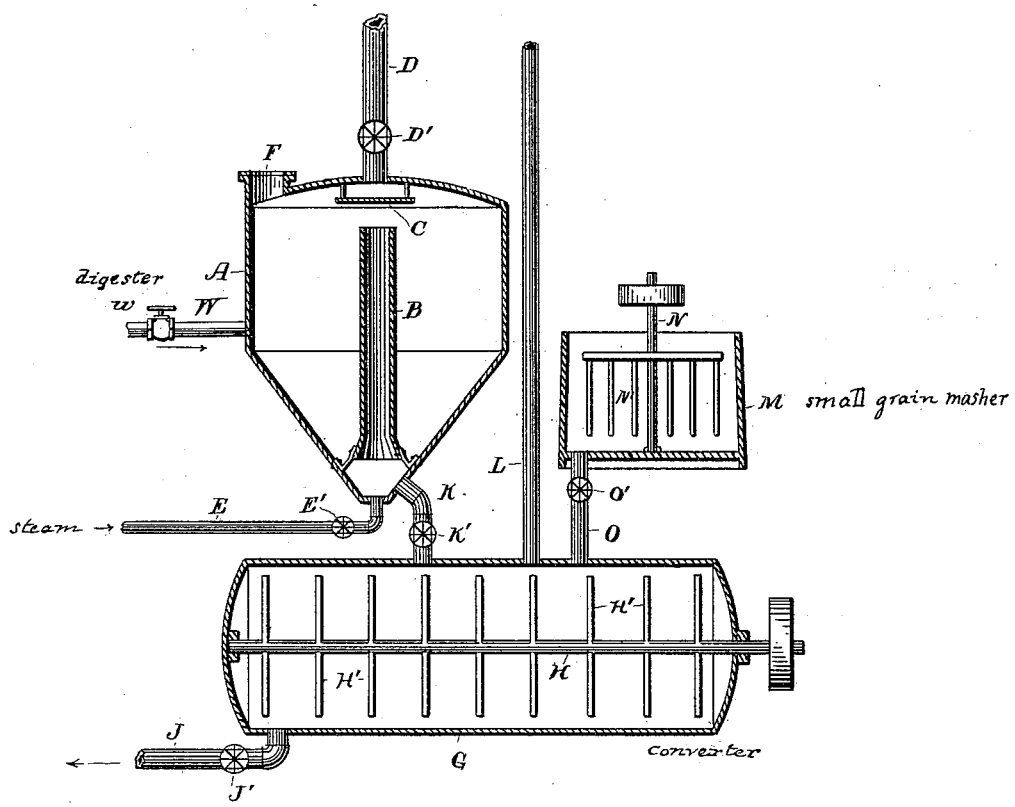

UNITED STATES PATENT OFFICE.

CHRISTIAN ANDERSEN, OF NEW YORK, N. Y., AND ADOLPH WOOLNER, JR., OF PEORIA, ILLINOIS.

PROCESS OF PREPARING WHOLE GRAIN FOR FERMENTATION.

SPECIFICATION forming part of Letters Patent No. 338,579, dated March 23, 1886.

Application filed June 22, 1885. Serial No. 169,404. (No model.)

*To all whom it may concern:*

Be it known that we, CHRISTIAN ANDERSEN, of the city, county, and State of New York, and ADOLPH WOOLNER, Jr., of Peoria, in the county of Peoria and State of Illinois, have invented an Improved Process of Preparing Whole Grain for Fermentation; and we do hereby declare that the following is a full, clear, and exact description thereof, reference being had to the annexed drawing, making a part of this specification, in which like letters of reference refer to like parts, and in which the figure represents a sectional elevation of the apparatus we have designed for carrying out the process.

Our invention relates to a process for treating grain without any previous pulverization thereof for vinous fermentation, known in the art to which it appertains as "mashing."

In carrying out our invention by means of steeping, digesting, and converting vessels, specially arranged, we are enabled to perfectly adapt the entire grain for vinous fermentation and to secure the maximum yield of its alcoholic properties.

Previous to our invention attempts have been made to accomplish our purpose, but with indifferent success. There had been in each case some defect to detract from the good results desired to be secured, either a burning of more or less of the grain or a clogging of the same within the disintegrating-vessel, or a waste of steam and power.

To overcome these objections and to secure the maximum yield of alcohol from the grain are the objects of our invention.

Our apparatus for treating the whole grain consists, essentially, of an air-tight steeping-vessel provided with water and steam inlet and vapor-outlet pipes, another vessel, which we herein call a "digester," within which is an open-ended vertical digesting-tube, and a converter provided with an interior rotatable agitator. The digester and converter are united by suitable pipes for closely connecting said vessels and appliances for excluding the air from said vessels and their connections. The digester is provided with water-inlet pipe, steam-inlet and vapor-escape pipes, and outlet-pipe for discharging the contents of said digester into a converter. The converter is also provided with an inlet-pipe leading from a small-grain receptacle and with an outlet-pipe for conveying the converted materials to the fermenting-tubs, and any suitable means for cooling the contents of said converter during progress of the process, an escape-pipe being shown in the drawing for carrying off heated vapor.

Our process consists, essentially, of the following steps, which we will state in consecutive order: First, the unbroken grain is introduced into a steeping-vessel, which is then hermetically closed. Then a suitable supply of water is introduced into said steeper and the contents are kept for a length of time under high steam-pressure and temperature. After the unpulverized grain is subjected to a high steam-pressure for a given length of time, a free steam-escape is allowed and the temperature and pressure gradually reduced. For another length of time the steeped grain, after being removed to the digester, is subjected therein to considerable agitation and with a free steam-escape, and is afterward transferred into the closed converter where it is cooled, and then prepared small grain is introduced into the converter and the materials are thoroughly commingled by means of a rotatable agitator, and then the contents of the converter are conveyed to the fermenting-tubs. During the whole process atmospheric air is entirely kept away from the grain, and this is one of the most important features of our invention.

In the drawing, A is the digester, provided with the vertical digesting-tube B, with open ends, suspended at the center of the same.

C is a baffle or diverting plate fixed a short distance above said digesting-tube B; but there may be more than one such bafflers, and also more than one digesting-tube without departing from the scope of our invention.

D is a vapor-escape pipe, supplied with a valve, D', for closing the same.

E is the steam-inlet pipe for admission of steam to heat the contents of the digester, and for causing the digesting circulation through the tube B.

E' is the valve of the steam-pipe E.

F is a man-hole for giving access to the digester.

W represents a water-inflow pipe; w, the valve thereof.

G is the converter, preferably cylindrical in shape, provided with a rotatable agitator, H, having stirrer-arms H', radiating therefrom, and carried thereby.

J is an outlet-pipe, provided with valve J', leading from the converter to the fermenters.

K is a pipe, having valve K', leading from the digester A to the converter G.

L is a vapor-withdrawal pipe, adapted to be employed in cooling the contents of the converter. It is provided with necessary valve and pump attachments.

M is the small-grain masher, provided with revolving stirrer-shaft N, supplied with rake-teeth N', common to such devices.

O is a discharge-pipe leading from the masher M to the converter G, for obvious purposes, and O' is the valve of said pipe.

Our process and manner of using an apparatus such as described and illustrated in the drawings, or analogous devices, is as follows: The grain in an unbroken condition is first introduced into a vessel of suitable construction wherein it passes through the first step or steeping process. Such steeping may be carried on within a vessel connected to the digester, or independent thereof, and the construction of such vessel is not herein claimed. The unpulverized grain being introduced into the steeping-vessel through a man-hole, said man-hole and all pipes leading into said vessel are hermetically closed. A suitable supply of water is then led into said steeper through an inlet-pipe, and the unpulverized grain is subjected to an undisturbed steeping at a high temperature and pressure— a pressure of several atmospheres, and a temperature above 300° Fahrenheit. The proportion of water used in the steeping step is about five gallons to a bushel of grain. When the steeper is approximately full of grain and water, all communications are tightly closed. The valve of the steam-inlet pipe is then opened. Steam at once rushes into the steeper, and in a short time the grain is subjected to a high degree of pressure and heat. In this condition the grain is kept in the steeper for about sixty minutes, thereby subjecting the same to what is termed the "steeping step" of the process. At the end of sixty minutes the valve of the steam-inlet pipe is closed and the valve of the steam-outlet pipe is opened, through which the steam from the steeper slowly escapes, and the temperature and pressure thereby gradually decreased. The steeped grain is then conveyed into the digester. When the steeped grain is within the digester, the conduit leading thereto is closed, and the next step of the process is proceeded with. Water is now introduced through a pipe, as W, within the digester, in the proportion of about fifteen or twenty gallons to the bushel of grain. The valve of the steam-inlet pipe is now opened, and through an upwardly-extending bend thereof steam enters within the digester at the lowermost point thereof. At the same time the vapor-escape pipe D is opened to facilitate a free steam-escape, whereby the temperature cannot far exceed the water-boiling point. The steam flows direct into and within the digesting-tube B, thus transmitting to the contents of said digester a strong vertical current, first circulating through said digesting-tube and thence outwardly into the mass of steeped grain. This circulation and impact of the mixed grain and water against the baffler after a time completely disintegrates, macerates, and digests the grain, which desired result is reached at the end of about an hour. After continuing this violent agitation for about sixty minutes the grain becomes thoroughly macerated and digested, and a portion of the starch is converted by the boiling at a low temperature into dextrine, thereby making a mash that is more easily converted and fermented than any mash which we have ever worked with. The low temperature just referred to is from 215° to 216°, since the pipe D gives free steam-escape and the contents of the digester cannot rise much above the normal boiling-point of water. It is essential that the discharge-opening of the steam-inlet pipe shall be flush with the lowest point of the bottom of the digester. The object of this is that all the contents of the digester shall be subjected to the agitation and none of the grain be left at the bottom undigested, as is the result when a steam-inlet pipe, as E, enters within the digester near the bottom thereof with an interior bend diverging upwardly or at any inclination. A discharge-pipe, as K, leads from the digester to the converter. At the end of the digestive action in the digester A the steam-inlet pipe is closed and the valve of the outlet-pipe K is opened, and the contents of the digester pass through said pipe K into the converter G, wherein the temperature of the digested mass is next reduced by any well-known means, such as pumping out the vapor through a pipe, as L, or in any other manner—as, for instance, wrapping a blanket around the converter-shell and flowing cold water through the resulting annular space or by supply-coils of cold water inside the converter. Small grain having been previously mashed within a masher, M, by means of a stirrer, N, is now led into the converter G, and thoroughly commingled by means of the agitator H with the digested grain, and the now completely prepared mash is withdrawn through a pipe, as J, and conveyed to the fermenters.

It will be noticed that means are provided for the complete exclusion of atmospheric air during each step of the process, and we thereby preclude the material in all its stages from being acted upon by the deleterious influences continuously present in the atmosphere which we deem of great importance in the preparation of pure mash.

We will observe that although we have described herein the steeper as connected to the digester, such construction is not essential in carrying out our process. Said steeping may be done in a separate disconnected vessel and the steeped grain fed into the digester in any suitable manner. Therefore we have not illustrated any steeping device in the drawing. Further, we make no claim to any part of the apparatus, as the same forms the subject-matter of another application for Letters Patent, Serial No. 172,854.

The digester, the converter, and the pipes communicating therewith, during the maceration, digesting, and intermingling of the grain in all its stages, are all hermetically closed, the exclusion of atmospheric air while preparing the mash being an essential element of our invention. This is an important feature of our process, since it preserves the essential properties of the grain. The objectionable influences of the air and its microscopic floaters thus have no effect while treating the grain for the purpose intended according to our process. The small pipe L serves for the escape of accumulated vapors in the converter, and if even open does not permit the entrance of objectionable atmosphere, as it will be obvious that an ascending stream will form a vapor seal, thus the converting mash is kept in a liquid state—a thing impossible to accomplish with an open vessel.

The amount of alcoholic liquor which we have been able to obtain by our process far exceeds that which we could secure by any of the processes in use for preparing distillery mashes.

Having now fully described our invention, what we claim, and desire to secure by Letters Patent, is—

1. The within-described process for preparing grain for distilling-mashes, which consists of the following steps: first, introducing whole steeped grain within a digesting and macerating vessel, then closing said vessel, then introducing therein a suitable supply of water, then subjecting the steeped unbroken grain to a steam-pressure of several atmospheres and to a temperature of about 300° Fahrenheit, or more, then permitting a limited vapor-escape, then agitating and digesting the contents of the vessel at a temperature of about or slightly above 216° Fahrenheit with free escape of steam, then conducting the digested mass to a closed converting-vessel, then cooling the mass, then admixing said material within said converter with small grain, substantially as set forth.

2. A process for treating unpulverized grain for subsequent fermentation, consisting of the following steps: first, subjecting the grain intermingled with a suitable supply of water to a steam-pressure of several amospheres at a temperature of 300° Fahrenheit, or more, for about one hour within a closed vessel, then supplying more water, decreasing the pressure to but slightly above the normal atmospheric pressure and to a temperature of about 216° by means of a limited vapor-escape, then digesting and macerating the contents of said vessel for from sixty to ninety minutes, and finally intermingling the mass with small mashed grain within a closed converter, as and for the purpose intended, substantially as set forth.

3. The within-described process for preparing distillery mashes for fermentation, which consists in macerating and digesting unpulverized grain, steeped in water, within a closed vessel, the inlet and outlet pipes of which being closed by suitable valves, such whole steeped grain being first subjected to a steam of several atmospheres and a temperature of about 300° Fahrenheit, or more, for about sixty minutes, which pressure and temperature are afterward reduced to about 215° Fahrenheit, whereby the whole mass is digested and agitated at a low temperature in from sixty to ninety minutes, then leading the macerated and digested mass to and within a closed converter, then cooling the same, then admixing therewith small grain, as and for the purpose intended, substantially as described.

In testimony that we claim the foregoing as our invention we have hereunto set our hands this 18th day of June, 1885.

CHRISTIAN ANDERSEN.
ADOLPH WOOLNER, JR.

In presence of—
A. B. UPHAM,
A. KEITHLEY.